United States Patent
Jamzadeh

(12) 
(10) Patent No.: US 7,410,447 B2
(45) Date of Patent: Aug. 12, 2008

(54) VEHICLE SPEED CONTROL SYSTEM

(75) Inventor: Fereydoon Jamzadeh, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 248 days.

(21) Appl. No.: 11/263,245

(22) Filed: Oct. 31, 2005

(65) Prior Publication Data

US 2007/0099759 A1    May 3, 2007

(51) Int. Cl.
 *B60W 10/04* (2006.01)
 *B60K 31/00* (2006.01)
 *B60T 8/32* (2006.01)
(52) U.S. Cl. ............................ 477/186; 180/170; 701/93
(58) Field of Classification Search ................. 477/4–6, 477/186, 187; 180/170, 178, 179; 701/70, 701/93
See application file for complete search history.

(56) References Cited

U.S. PATENT DOCUMENTS

| | | | |
|---|---|---|---|
| 4,867,288 A * | 9/1989 | Simonyi et al. | 477/186 |
| 5,508,925 A * | 4/1996 | Katayama et al. | 701/93 |
| 5,941,614 A * | 8/1999 | Gallery et al. | 303/192 |
| 6,128,570 A * | 10/2000 | Akhteruzzaman | 701/93 |
| 6,299,263 B1 * | 10/2001 | Uematsu et al. | 303/192 |
| 6,527,076 B1 * | 3/2003 | Polzin | 180/170 |
| 6,769,504 B2 * | 8/2004 | Kobayashi et al. | 180/169 |
| 7,134,985 B2 * | 11/2006 | Watanabe et al. | 477/186 |
| 2002/0133285 A1 * | 9/2002 | Hirasago | 701/96 |

* cited by examiner

Primary Examiner—Roger Pang

(57) ABSTRACT

The present invention provides a method for automatic downhill speed control or ADSC adapted to automatically absorb grade-induced energy so that the vehicle operator is no longer required to take action to maintain generally constant vehicle speed. ADSC is preferably triggered if the throttle is released and the vehicle accelerates. The specific amount of throttle release necessary to trigger ADSC is variable but may, according to a preferred embodiment, be set at 85% throttle reduction. According to another preferred embodiment, ADSC is not triggered unless the throttle is released for a predetermined amount of time such as, for example, 5 seconds.

14 Claims, 3 Drawing Sheets

VEHICLE SPEED CONTROL SYSTEM

TECHNICAL FIELD

The present invention relates to a vehicle speed control system.

BACKGROUND OF THE INVENTION

To prevent a vehicle from accelerating while traveling downhill, the operator of the vehicle generally must reduce the throttle and/or apply the brakes. It would therefore be desirable to automatically absorb the grade-induced energy so that the vehicle operator is no longer required to take action to maintain generally constant vehicle speed.

SUMMARY OF THE INVENTION

If it is determined that the operator wishes to maintain an established vehicle speed while traveling downhill, a method for automatic downhill speed control or ADSC according to the present invention is adapted to absorb the grade-induced energy so that the vehicle does not accelerate. For purposes of the present invention, it is determined that the operator wishes to maintain an established vehicle speed while traveling downhill if the throttle is released and the vehicle speed increases. The specific amount of throttle release necessary to trigger ADSC is variable but may, according to a preferred embodiment, be set at 85% throttle reduction. According to another preferred embodiment, ADSC is not triggered unless the throttle is released for a variable amount of time such as, for example, 5 seconds.

A feedback controller compares a predefined vehicle target speed with the current vehicle speed to generate an error signal. The error signal is preferably implemented to produce a command signal which is sent to a retarding and/or regenerating device to absorb the grade-induced energy and thereby maintain the target vehicle speed.

In one aspect of the present invention, ADSC is not applied unless the vehicle's brake pedal is released.

In another aspect of the present invention, ADSC is not applied unless the current vehicle speed is greater than a predefined minimum vehicle speed.

In yet another aspect of the present invention, ADSC is not applied unless the vehicle's anti-lock brake system is deactivated.

In still another aspect of the present invention, ADSC is not applied unless the present and requested modes of operation are both forward speed ratios.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
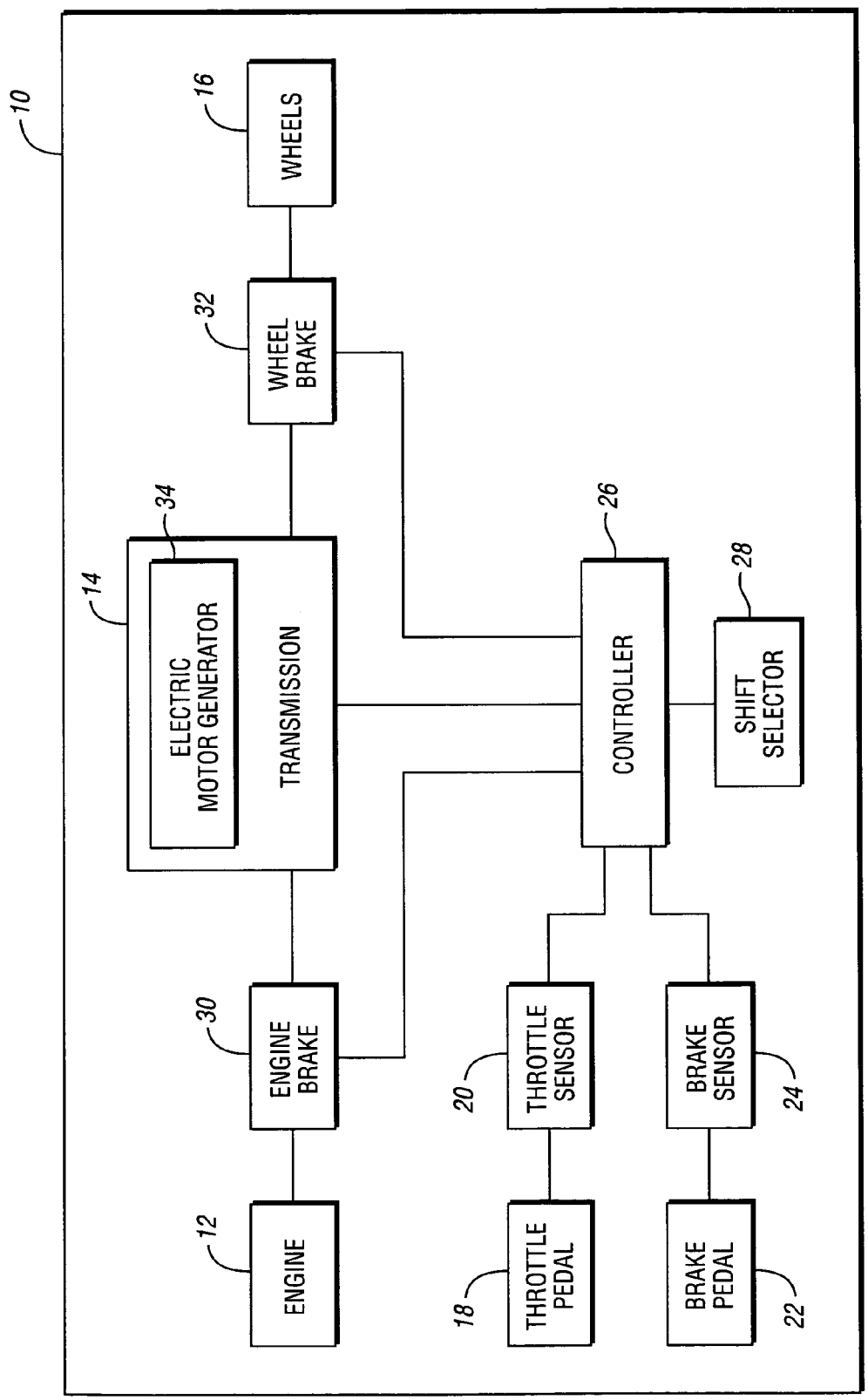
FIG. 1 is a schematic illustration of a vehicle in accordance with an aspect of the invention.

Referring to the drawings, wherein like reference numerals represent the same or corresponding parts through the several views, there is shown in FIG. 1 a schematic depiction of a vehicle 10 having an engine 12, a transmission 14, and a plurality of wheels 16. The vehicle 10 also includes a throttle pedal 18, a throttle sensor 20, a brake pedal 22, a brake sensor 24 and a controller 26. The controller 26 may be electronically connected to a shift selector 28, an engine brake 30, the transmission 14, and/or wheel brakes 32. According to a preferred embodiment of the present invention, the vehicle 10 is a hybrid vehicle and the transmission 14 includes an electric motor/generator 34 or a hydraulic pump/motor (not shown).

If it is determined that the operator wishes to maintain an established vehicle speed while traveling downhill, a method for automatic downhill speed control or ADSC according to the present invention is adapted to absorb the grade-induced energy so that the vehicle does not accelerate. For purposes of the present invention, it is determined that the operator wishes to maintain an established vehicle speed while traveling downhill if the throttle is released and the vehicle speed increases. The specific amount of throttle release necessary to trigger ADSC is variable but may, according to a preferred embodiment, be set at 85% throttle reduction. According to another preferred embodiment, ADSC is not triggered unless the throttle is released for a predetermined amount of time such as, for example, 5 seconds. It should, however, be appreciated that the predetermined amount of time may vary as required to meet the needs of a particular application.

A feedback controller compares a predefined vehicle target speed ST with the current vehicle speed SV to generate an error signal ΔS. According to a preferred embodiment, the feedback controller of the present invention is a proportional plus integral controller or PI controller, however, it should be appreciated that other types of controllers may be implemented as well. The error signal ΔS is preferably implemented to produce a command signal S which is sent to a retarding and/or regenerating device to absorb the grade-induced energy and thereby maintain the target vehicle speed ST.

As shown in FIG. 1, the retarding and/or regenerating device adapted to absorb the grade-induced energy can take any of several different forms. For example, the engine brake 30, internal clutch elements (not shown) in the transmission 14, and/or the wheel brakes 32 may be implemented to absorb the grade-induced energy. According to the preferred embodiment wherein the vehicle 10 is a hybrid vehicle, the electric motor/generator 34 or the hydraulic pump/motor (not shown) may also be adapted to absorb the grade-induced energy and store the absorbed energy in an attached battery or accumulator (not shown). This embodiment is particularly advantageous because the stored energy may be used to power the vehicle 10 thereby reducing reliance on the engine 12 and improving the efficiency of the vehicle 10.

Figure 2:
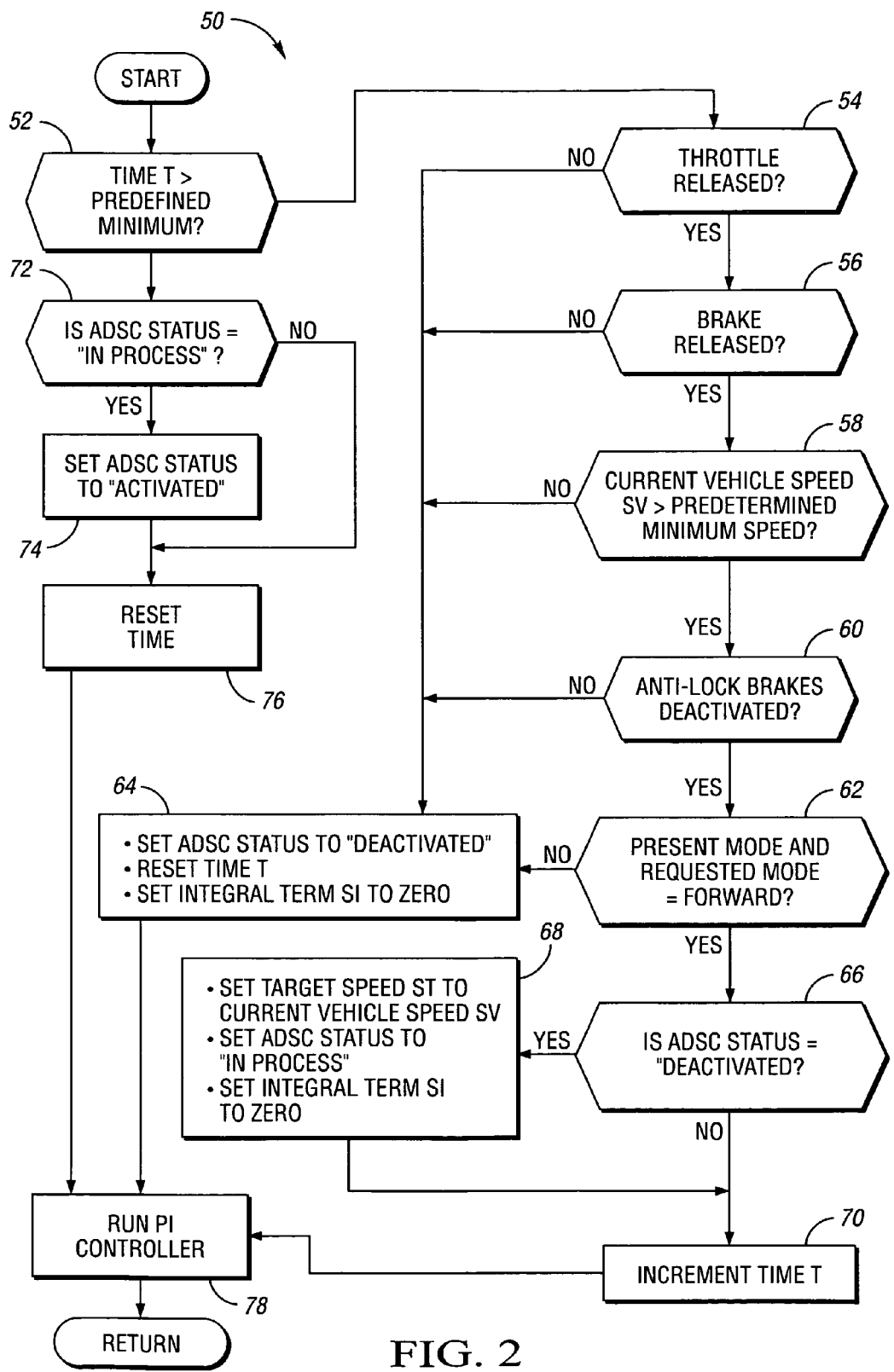
FIG. 2 is a block diagram illustrating a method according to a preferred embodiment of the present invention.
Figure 3:
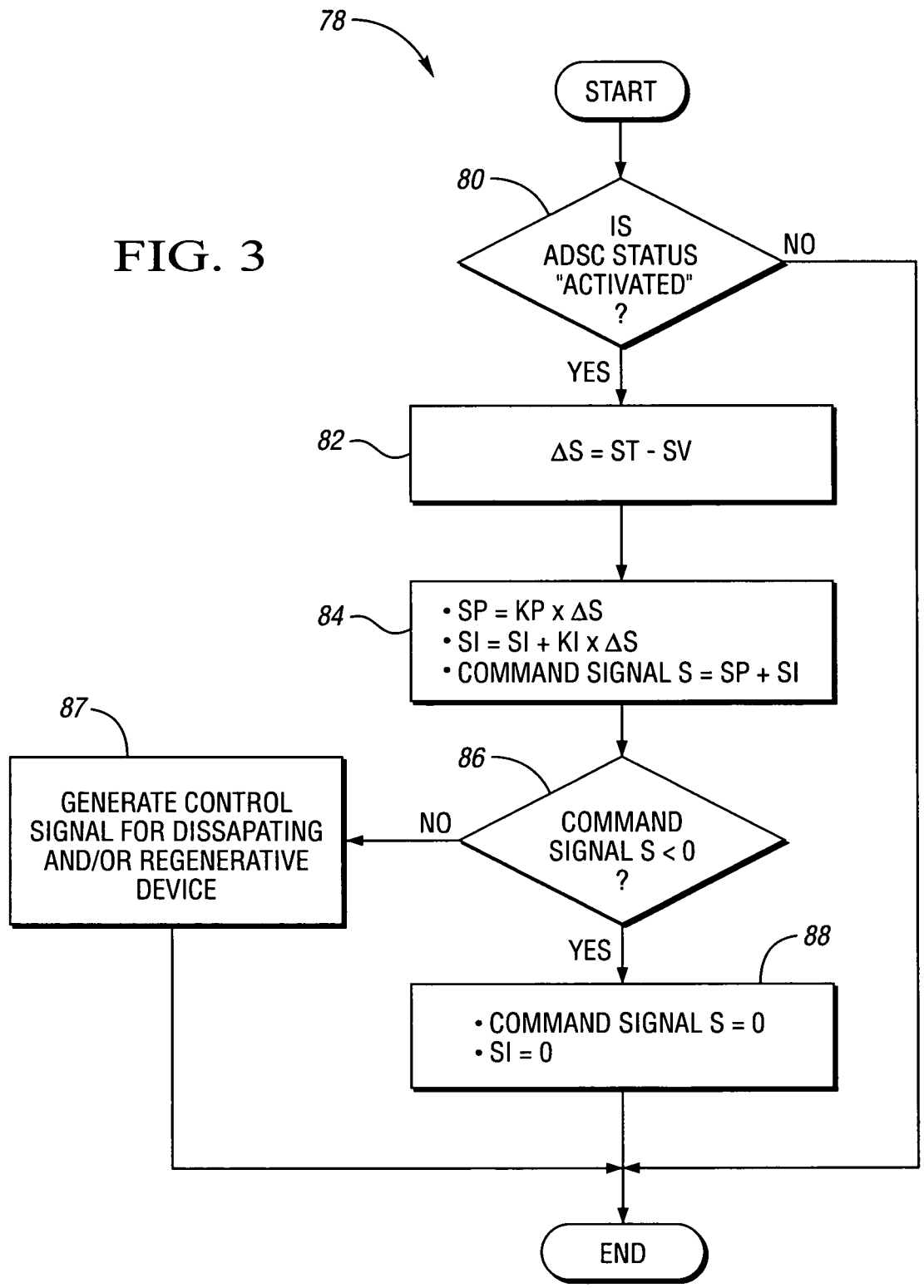
FIG. 3 is a block diagram illustrating a step of FIG. 2 wherein a control algorithm is run.

FIGS. 2-3 depict a method of the present invention. More precisely, FIGS. 2-3 show a series of block diagrams representing steps performed by the controller 26 (shown in FIG. 1).

Referring to FIG. 2, the method 50 for automatic downhill speed control (also referred to herein as algorithm 50) of the present invention is configured at step 52 to determine whether a time T measured by a timer is greater than a predefined time value. According to a preferred embodiment, the predefined time value is five seconds, however, it should be appreciated that alternate time values may also be selected. If the time T is greater than the predetermined time value, the algorithm 50 proceeds to step 72. If the time T is not greater than the predetermined time value, the algorithm 50 proceeds to step 54.

Steps 54-62 generally represent a series of conditions or triggering criteria that must be met before ADSC is activated. At step 54, the algorithm 50 determines if the throttle is released. The specific amount of throttle release required at step 54 is variable but may, according to a preferred embodiment, be set at 85%. Throttle release is preferably measured by the throttle sensor 20 which is adapted to monitor the throttle pedal 18. If the throttle is not released, the algorithm 50 proceeds to step 64. If the throttle is released, the algorithm 50 proceeds to step 56.

At step 56, the algorithm 50 determines if the brake is completely released. Step 56 is preferably implemented because if the operator is manually applying the brake to maintain vehicle speed, ADSC is unnecessary. Application of the brake is preferably identified by the brake sensor 24 which is adapted to monitor the brake pedal 22. If the brake is not released, the algorithm 50 proceeds to step 64. If the brake is released, the algorithm 50 proceeds to step 58.

At step 58, the current vehicle speed SV is measured to determine if the current vehicle speed SV is greater than a predefined minimum speed. The predefined minimum speed is variable but may, according to a preferred embodiment, be set at 5 mph. Step 58 is preferably implemented because it has been determined that it is generally not desirable to use ADSC at very low vehicle speed. The current vehicle speed SV is preferably provided by a conventional speed sensor (not shown) such as that used for the speedometer. If the current vehicle speed SV is not greater than the predefined minimum speed, the algorithm 50 proceeds to step 64. If the current vehicle speed SV is greater than the predefined minimum speed, the algorithm 50 proceeds to step 60.

At step 60, the algorithm 50 determines if the anti-lock brakes of the vehicle 10 are deactivated. Step 60 is preferably implemented because if the anti-lock brakes are activated vehicle traction may be less than optimal and ADSC is therefore not applied. If the anti-lock brakes are deactivated, the algorithm 50 proceeds to step 62. If the anti-lock brakes are not deactivated, the algorithm 50 proceeds to step 64.

At step 62, the algorithm 50 determines if the present mode and requested mode are both "forward". In other words, at step 62 the algorithm 50 determines if the attained gear and commanded gear are both forward speed ratios (i.e. not neutral or reverse). The present and requested modes of the vehicle 10 are preferably identified by a sensor (not shown) connected to the shift selector 28. If the present mode and requested mode are not both "forward", the algorithm 50 proceeds to step 64. If the present mode and requested mode are both "forward", the algorithm 50 proceeds to step 66.

At step 64, the algorithm 50 sets the ADSC status to "deactivated", resets the time T to zero, and sets an integral term SI of the PI controller to zero. The integral term SI and the PI controller will be described in more detail hereinafter. After completing step 64, the algorithm 50 returns to step 52.

At step 66, the algorithm 50 determines if the ADSC status is "deactivated". If the ADSC status is "deactivated", the algorithm 50 proceeds to step 68. If the ADSC status is not "deactivated", the algorithm 50 proceeds to step 70. At step 68, the algorithm 50 sets the target vehicle speed ST to the current vehicle speed SV, sets the ADSC status to "in process", and sets the integral term SI of the PI controller to zero. After completing step 68, the algorithm 50 proceeds to step 70. At step 70, the algorithm 50 increments the time T by a predetermined amount. The predetermined amount by which the time T is incremented is variable but may, according to a preferred embodiment, be incremented by the loop time (e.g., 20 milliseconds) at step 70. After completing step 70, the algorithm 50 returns to step 52.

At step 72, the algorithm 50 determines if the ADSC status is "in process". If the ADSC status is "in process", the algorithm 50 proceeds to step 74. If the ADSC status is not "in process", the algorithm 50 proceeds to step 76. At step 74, the algorithm 50 sets the ADSC status to "activated". After completing step 74, the algorithm 50 proceeds to step 76. At step 76, the algorithm 50 resets the time T to zero. After completing step 76, the algorithm 50 proceeds to step 78. At step 78, the algorithm 50 runs the PI controller as will be described in detail hereinafter. After completing step 78, the algorithm 50 returns to step 52.

Referring to FIG. 3, step 78 wherein a PI controller is run is shown in more detail. A "PI controller" is a type of feedback controller adapted to automatically hold a measured value at a predetermined target value and thereby eliminate the need for continuous operator attention. As is well known in the art, PI controllers have a proportional term and an integral term which are both related to an error term. The error term is defined as (target value−measured value). For purposes of the present invention, the measured value is the current vehicle speed SV and the target value is the target speed ST.

At step 80, the algorithm 50 determines if the ADSC status is "activated". If the ADSC status is "activated", the algorithm 50 proceeds to step 82. If the ADSC status is not "activated", no further action is taken during the current time loop of the algorithm 50. At step 82, the error term ($\Delta S$) of the PI controller is calculated according to the equation $\Delta S=$(target speed ST−current speed SV).

At step 84, a proportional term SP and an integral term SI of the PI controller are calculated. A command signal S is also calculated at step 84. The proportional term PI is calculated according to the equation $PI=(KP \times \Delta S)$ where KP is a constant representing the proportional term gain. The integral term SI is calculated according to the equation $SI=(SI+KI \times \Delta S)$ where KI is a constant representing the integral term gain. The command signal S is a combination of the proportional and integral terms and is therefore calculated according to the equation $S=(SP+SI)$. The command signal S is transmitted to one of the vehicle's retarding and/or regenerating devices (e.g., engine brake 30, motor generator 34, or wheel brake 32) which is applied to absorb grade induced energy and reduce current vehicle speed SV such that the current vehicle speed SV is maintained at or near the target vehicle speed ST.

At step 86, the PI controller of step 78 determines whether the command signal S is a negative value. If at step 86 the command signal S is not negative, the PI controller proceeds to step 87. At step 87, the PI controller produces a signal used to control a dissipating and/or regenerative device. If at step 86 the command signal S is negative, the PI controller proceeds to step 88. At step 88, the command signal S and the integral term SI of the PI controller are set to zero. It should be appreciated that if the vehicle is not accelerating, the command signal S will be negative and the PI controller will therefore bypass step 87 such that the command signal for the dissipating and/or regenerative device is not generated. In this manner, ADSC is only implemented if the vehicle accelerates and speed increases beyond the target speed ST.

While the best modes for carrying out the invention have been described in detail, those familiar with the art to which this invention relates will recognize various alternative designs and embodiments for practicing the invention within the scope of the appended claims.

The invention claimed is:

1. A method for automatic downhill speed control of a vehicle comprising:

determining if a plurality of predefined triggering criteria have been met including:

determining whether a throttle of the vehicle has been released;

determining whether a vehicle brake has been released; and determining whether the speed of the vehicle is greater than a predefined minimum vehicle speed;

establishing a target vehicle speed if said predefined triggering criteria are met; and implementing a control algorithm if said predefined triggering criteria are met wherein the control algorithm is adapted to automatically maintain the speed of the vehicle at or near the target vehicle speed.

2. The method of claim 1 further comprising monitoring said triggering criteria for a predetermined amount of time.

3. The method of claim 1, wherein said implementing a control algorithm includes generating a command signal that may be transmitted to a retarding device to absorb grade induced energy.

4. The method of claim 1, wherein said determining if a plurality of predefined triggering criteria have been met further includes determining whether an anti-lock brake system of the vehicle is deactivated.

5. The method of claim 1, wherein said determining if a plurality of predefined triggering criteria have been met further includes determining whether the presently selected mode of operation of the vehicle is a forward speed ratio.

6. The method of claim 1, wherein said determining if a plurality of predefined triggering criteria have been met further includes determining whether the requested mode of operation of the vehicle is a forward speed ratio.

7. A method for automatic downhill speed control of a vehicle having a retarding device, said method comprising:

determining if a plurality of predefined triggering criteria have been met including:

determining whether a throttle of the vehicle has been released;

determining whether a vehicle brake has been released; and determining whether the speed of the vehicle is greater than a predefined minimum vehicle speed;

establishing a target vehicle speed if said predefined triggering criteria are met; and implementing a control algorithm if said predefined triggering criteria are met including generating a command signal that may be transmitted to the retarding device to absorb grade induced energy and thereby automatically maintain the speed of the vehicle at or near the target vehicle speed.

8. The method of claim 7, wherein said determining if a plurality of predefined triggering criteria have been met further includes determining whether an anti-lock brake system of the vehicle is deactivated.

9. The method of claim 7, wherein said determining if a plurality of predefined triggering criteria have been met further includes determining whether the presently selected and requested modes of operation of the vehicle are a forward speed ratio.

10. The method of claim 7, wherein said retarding device is a clutch, a brake, an electric motor/generator, or a hydraulic pump/motor.

11. A method for automatic downhill speed control of a vehicle having a retarding device, said method comprising:

determining if a plurality of predefined triggering criteria have been met including:

determining whether a throttle of the vehicle has been released;

determining whether a vehicle brake has been released; and determining whether the speed of the vehicle is greater than a predefined minimum vehicle speed;

monitoring the triggering criteria for a predetermined amount of time;

establishing a target vehicle speed if all the predefined triggering criteria are met; and implementing a control algorithm if all the predefined triggering criteria are met for the duration of the predetermined amount of time, said running a controller including generating a command signal that may be transmitted to the retarding device to absorb grade induced energy and thereby automatically maintain the speed of the vehicle at or near the target vehicle speed.

12. The method of claim 11, wherein said determining if a plurality of predefined triggering criteria have been met further includes determining whether an anti-lock brake system of the vehicle is deactivated.

13. The method of claim 11, wherein said determining if a plurality of predefined triggering criteria have been met further includes determining whether the presently selected and requested modes of operation of the vehicle are a forward speed ratio.

14. The method of claim 11, wherein said retarding device is a clutch, a brake, an electric motor/generator, or a hydraulic pump/motor.

* * * * *